United States Patent [19]

Kumazawa et al.

[11] Patent Number: 5,472,798
[45] Date of Patent: Dec. 5, 1995

[54] COLORING STRUCTURE HAVING REFLECTING AND INTERFERING FUNCTIONS

[75] Inventors: Kinya Kumazawa, Yokosuka; Hiroshi Tabata, Yokohama; Junichi Takimoto, Yokosuka, all of Japan

[73] Assignee: Nissan Motor Co., Ltd., Kanagawa, Japan

[21] Appl. No.: 272,487

[22] Filed: Jul. 11, 1994

[30] Foreign Application Priority Data

Jul. 16, 1993 [JP] Japan .................................. 5-176765
Jul. 16, 1993 [JP] Japan .................................. 5-176768

[51] Int. Cl.$^6$ ................................................. D03D 25/00
[52] U.S. Cl. ........................... 428/690; 428/36.3; 428/37; 428/225; 428/298; 428/373; 428/542.6; 428/913
[58] Field of Search ................... 428/690, 32, 36.3, 428/37, 225, 298, 373, 542.6, 913

[56] References Cited

FOREIGN PATENT DOCUMENTS

| | | |
|---|---|---|
| 314185 | 6/1943 | Japan . |
| 59-228042 | 12/1984 | Japan . |
| 60-24847 | 6/1985 | Japan . |
| 62-170510 | 7/1987 | Japan . |
| 63-64535 | 12/1988 | Japan . |

OTHER PUBLICATIONS

"Studies on the Photo–Controllable Coloring Fibers: Part 1: Photo–Controllable Coloring of Laminated Polymer Films by Optical Interference", Kiyoichi Matsumoto et al., vol. 42, No. 2, p. 55.

"Studies on the Photo–Controllable Coloring Fibers: Part 2: Hue Analysis of the Photo–Controllable Coloring Films", Kiyoichi Matsumoto et al., vol. 42, No. 10, p. 60, 1989.

*Primary Examiner*—Charles R. Nold
*Attorney, Agent, or Firm*—Lowe, Price, LeBlanc & Becker

[57] ABSTRACT

A coloring structure for generating a color having a wave length in an area of a visible light by reflecting and interfering actions of a natural light includes first substance layers having an optical refractive index of $n_a$ and second substance layers having an optical refractive index of $n_b$. The second layers overlie respective first layers in an alternating arrangement of the first and second layers. In order to generate a brilliant color by the reflecting and interfering actions, the optical refractive indexes $n_a$ and $n_b$ are established to satisfy both of relationships "$1.3 \leq n_a$" and "$1.1 \leq n_b/n_a \leq 1.4$". The coloring structure may contain a fluorescent pigment.

10 Claims, 16 Drawing Sheets

COLORING STRUCTURE HAVING REFLECTING AND INTERFERING FUNCTIONS

BACKGROUND OF THE INVENTION

1. Field of the Invention

This invention relates to a coloring structure which colors by reflection and interference of natural light and more particularly, to coloring fibers and tips used in a textile fabric, paint and so on.

2. Description of the Related Art

Recently, in a painting field for automobile, not only the conventional metallic painting using radiant materials of aluminum flakes but also a new painting using mica flakes, processed mica flakes or carbon fiber tips as the radiant materials have been worthy of notice in terms of an improvement in material feeling of painted surfaces and a fact to offer an anisotropically character thereto. Also in a field of an interior textile fabric, materials used in the above paintings and hues thereof have been taken seriously in terms of the improvement in material feeling.

In the former painting, however, the hue is gradually faded since paints containing pigments are gradually deteriorated by ultraviolet rays, infrared rays and so on, although the hue is also influenced by the radiant materials themselves contained in the paints. Also in the latter painting, a deterioration of paints and pigments used therein cannot be avoided at present.

In order to solve the above-mentioned problems, it has been studied a coloring structure which can generate colors by reflection and interference of the natural light without using coloring matters such as the paints and pigments etc. or which can generate deep and brilliant colors by a combination of the reflection and interference of the natural light with the paints or pigments contained the structure. For instance, Japanese Examined Patent Publication (Kokoku) No. 43-14185 discloses composite fibers to produce brilliance like a pearl by forming an overlapped-type of compound fiber consisting of more than two kinds of resins in different refractive Indexes. Furthermore, in documents of the society of textile manufacturing machine (vol. 42, No. 2, p. 55 and vol. 42, No. 10, p. 60; 1989), there are disclosed materials which can generate color by laminating an anisotropically molecular oriented film between two polarizing films.

However, in the above materials containing the anisotropically molecular oriented film, it is difficult to provide the materials in the form of thin fibers or small tips and to control a main wave length of light reflected by the materials. Therefore, it is not practical to use such materials for the coloring structure.

In Japanese Patent Publication Nos. 59-228042 (Kokai), 60-24847 (Kokoku) and 63-64535 (Kokoku), on the basis of a coloring structure of "Morpho" butterflies in South America, there are disclosed structures which can generate colors by the interference of natural light without using the normal pigments or paints. In addition, Japanese Patent Publication (Kokai) No. 62-170510 discloses a structure to generate an interfering color by arranging clearances of a constant width on surfaces of fibers in the structure.

However, since these publications do not teach the detailed specifications of the structures (ex. their thicknesses, lengths, refractive indexes of constituents etc.), it is impossible for those skilled in this art to manufacture a desired coloring structure on the basis of instructions disclosed in the publications.

Taking the above mentioned problems into consideration, we have already filed a coloring structure providing a brilliant hue which has never been obtained in the above-mentioned prior arts and which has few periodical changes in Japanese Patent Application Serial No. 4-172926.

SUMMARY OF THE INVENTION

Under the above mentioned circumstances, it is an object of the present invention to advance our previous coloring structure, thereby providing a new coloring structure which can produce a further brilliant and high-grade color in comparison with the above mentioned coloring structures.

Another object of the present invention is to provide a coloring structure which can be easily manufactured and which has the reflecting and interfering actions to provide a brilliant hue at a desired wave length stably and certainly.

In order to achieve the above-mentioned objects, the present invention provides a coloring structure for generating a color having a wave length in an area of a visible light by reflecting and interfering actions of a natural light, comprising:

first substance layers consisting of a first material, each of the first substance layers having an optical refractive index of $n_a$; and optical refractive index of $n_b$ and overlying a respective one of said first substance layers in an alternating arrangement of the first and second layers wherein the relationship between the optical refractive indexes $n_a$ and $n_b$ is established to satisfy the following expressions.

$$1.3 \leq n_a$$

$$1.1 \leq n_b/n_a \leq 1.4.$$

In the preferred aspect of the present invention, the coloring structure contains a fluorescent pigment which generates fluorescence corresponding to the color. Furthermore, in the preferred aspect having the above mentioned structure, the fluorescent pigment is contained in the coloring structure with a range of 0.01 through 1.0 weight percentage.

In the other preferred aspect of the present invention, each of the first substance layers has a thickness of $d_a$ and each of the second substance layers has a thickness of $d_b$ and a reflective peak wave length (a peak wave length of reflecting spectrum) is $\lambda$, wherein the values of $d_a$, $d_b$ and $\lambda$ are established to satisfy an expression of $$\lambda = 2(n_a \cdot d_a + n_b \cdot d_b)$$

and the relative variation of $d_a$ and $d_b$, that is, maximum values of manufacturing differences from standards in the thicknesses of both of the first and second substance layers are less than 40 percent of thereof, respectively. Furthermore, in the preferred aspect having the above mentioned structure, the coloring structure contains a fluorescent pigment which generates fluorescence corresponding to a coloring of the structure. More preferably, in this coloring structure, the fluorescent pigment is contained in a range of 0.01 through 1.0 weight percentage.

According to the present invention, there is also provided a coloring structure for generating a color having a wave length in an area of a visible light by reflecting and interfering actions of a natural light, comprising:

first layers consisting of a first polymer substance having no transparent impurities to increase an optical refractive index of thereof; and second layers consisting of a second polymer substance having no transparent impurities to increase an optical refractive index of thereof, each of the second layers overlying each of the first layers by turns;

wherein the optical reflective index of each of the first layer is different from the optical reflective index of each of the second layers.

BRIEF DESCRIPTION OF THE DRAWING

FIGS. 1A, 1B and 1C show a variety of cross-sections of a coloring structure according to a first embodiment of the present invention, in which FIG. 1A is a rectangular cross sectional view thereof and FIG. 1B is a circular cross sectional view and FIG. 1C is an elliptic cross sectional view;

FIGS. 2A and 2B show a variety of cross-sections of a coloring structure according to a second embodiment of the present invention, in which FIG. 2A shows layers each of which extends discontinuously in a horizontal direction of the structure and FIG. 2B shows layers having a different cross section from those of FIG. 2A;

FIGS. 12A and 12B show cross-sections of a coloring structure according to a third embodiment of the present invention, in which FIG. 12A is a perspective view and FIG. 12B is a cross sectional view;

FIGS. 13A and 13B show cross-sections of the coloring structure of FIGS. 12A and 12B, in which FIG. 13A shows the structure in process of manufacturing and FIG. 13B shows the finished structure;

DESCRIPTION OF THE PREFERRED EMBODIMENT

Figure 1A:
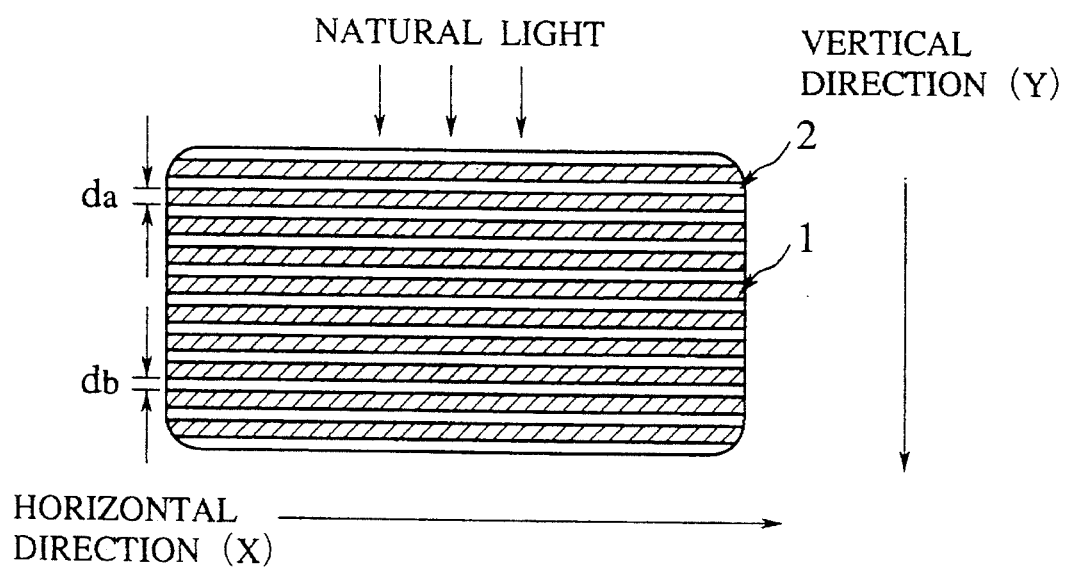
Figure 1B:
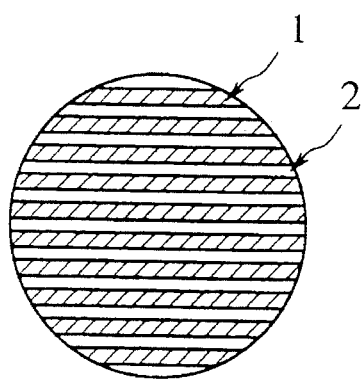
Figure 1C:
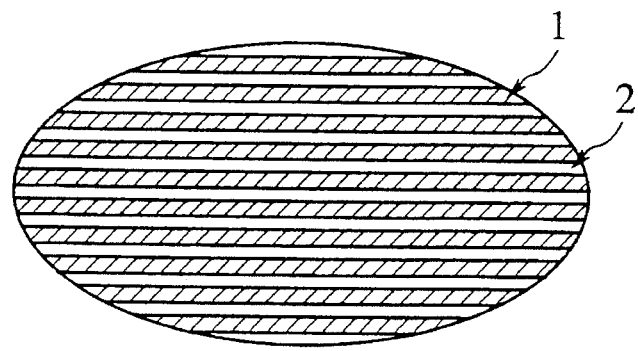
Figure 2A:
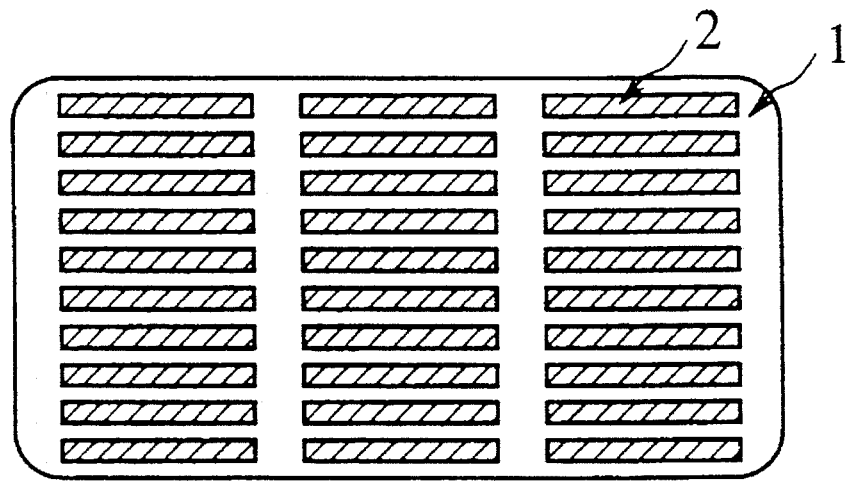

FIGS. 1A, 1B and 1C shows various cross sections of a coloring structure according to the first embodiment of the present invention. Similarly, FIGS. 2A and 2B shows cross sections of the coloring structure according to the second embodiment of the invention.

In these figures, reference numeral 1 denotes first substance layers, and 2 second substance layers. These substance layers 1 and 2 are constituted by thin films made of materials, such as polymer resin, of different refractive indexes.

Figure 2B:
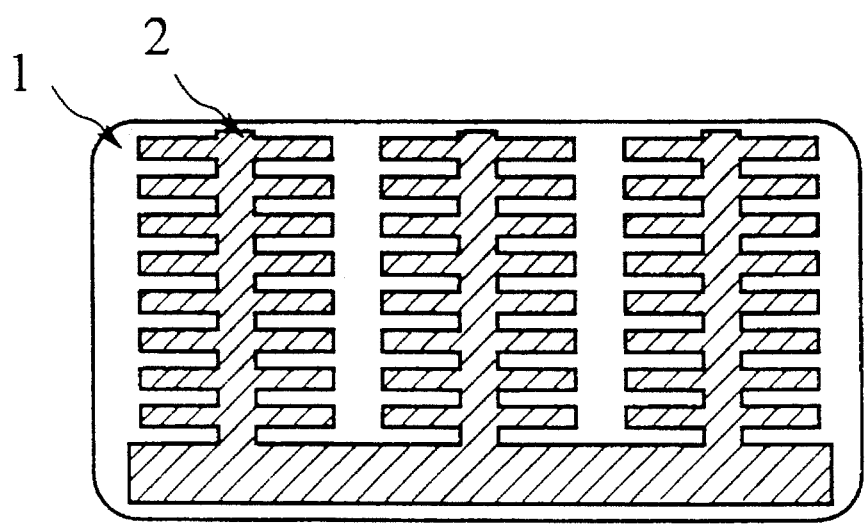

FIGS. 1A to 2B show various cross sections of the coloring structure, such as a yarn, in which FIG. 1A is a rectangular cross sectional view; FIG. 1B is a circular cross sectional view; FIG. 1C is an elliptic cross sectional view; FIG. 2A shows the second substance layers 2 each of which extends discontinuously in a horizontal direction of the structure and FIG. 2B shows the second substance layers 2 having different cross sections from those in FIG. 2A.

As shown in the figures, the structures of the embodiments comprise multilayered (laminated) construction consisting of two kinds of substances of different refractive indexes, which alternate with each other. Note that, the expression of "multilayered" in this specification means a situation in which two kinds of substance layers of thicknesses of certain extents ($d_a$, $d_b$) are laminated in a vertical direction of y of FIG. 1A by turns and in which each of the substances layers have lengths of certain extents in the horizontal direction of x of FIG. 1A, respectively. Therefore, through the specification, a term of "vertical incident" of the natural light against the present structure expresses a situation in which the light is intruding into the substance layers along the vertical direction y, as shown in FIG. 1A.

In the embodiment, the above substances are made of polymer resin, and more particularly, of thermoplastic resin, having transparency of a certain extent against the visible light. For the substances, polyester, polyacrylonitril, polystyrene, nylon, polypropylene, polyvinyl alcohol, polycarbonate, poly.M-cryle acid methyl, polyether/etherketone, poly.P-phenylene telephthalamide, polyphenylene sulfid etc. are applicable. In the present coloring structure, two kinds of polymer materials would be selected from the above substances, corresponding to the practical objects and applications.

According to the present invention, against the vertical incident of the natural light, both first substance layers 1 (optical refractive index: $n_a$) and second substance layers 2 (optical refractive index: $n_b$) are mutually laminated in two ways. That is, in one way, the first substance layer 1, the second substance layer 2, the first substance layer 1 . . . are arranged from a surface in order, and vice versa in the other way. In the present coloring structure, even if either of the two ways is employed, there would not be produced a large difference in their coloring therebetween. However, from a point of reducing the reflection of light from a surface of the structure, it is preferable to arrange the substance layer of lower refractive index (i.e., the first substance layer 1 of the refractive index $n_a$) adjacent to a surface facing the natural light. Each of the structures shown in FIGS. 1A to 1C has the second substance layer 2 adjacent to the surface. Conversely, each of the structures shown in FIGS. 2A and 2B has the first substance layer 1 adjacent to the surface.

If only the respective substance layers are regularly arranged in the horizontal direction of X, there would be no matter whether they extend continuously in the horizontal direction as shown in FIGS. 1A to 1C or discontinuously as shown in FIGS. 2A and 2B. From points of manufacturing of the structure and effects derived therefrom, the continuous arrangement of the layers is preferable. In case that the substance layers are arranged discontinuously in the horizontal direction of X, a length of each layer is preferably more than a wave length λ (nm) of the reflecting light as a matter of course. Furthermore, as shown in FIGS. 2A and 2B, the multilayered construction in cross section may be like islands in the sea.

In case of providing more brilliant hue against fibers, such as textile, woven goods etc., it is preferable that the structure has any one of substantially flat shaped cross sections as shown in FIGS. 1A, 1C, 2A and 2B in order to facilitate the incident of natural light perpendicular to the horizontal direction X of the fibers.

By the inventor's consideration, it is found that there needs to satisfy the following relationships between an optical reflective index $n_a$ of the first substance layer 1, a thickness $d_a$ thereof, a reflective index of $n_b$ of the second substance layer 2 and a thickness $d_b$, in order to attain the objects of the invention. That is, in case of the vertical incident, a reflective peak wave length λ can be obtained by a calculation as follows.

$$\lambda = 2(n_a \cdot d_a + n_b \cdot d_b)$$

Then, the above properties are under the following conditions.

$$1.3 \leq n_a$$

$$1.1 \leq n_b/n_a \leq 1.4$$

Further, it is necessary that the relative variation of thicknesses $d_a$ and $d_b$, i.e., maximum differentials from manufacturing standards in the thicknesses are less than values of 40 percent of the standards, respectively.

We now describe reasons of the above restrictions in detail.

First, regarding the restriction of "$1.3 \leq n_a$", it is derived from a fact that the refractive index of polymer resin is generally within a range of 1.30 to 1.82 (1.35 to 1.75 for general purpose). Accordingly, the refractive index is established to have a value of 1.3 in at minimum. Note that, although it is possible to attain the refractive index less than 1.3 by containing atomized crystals, such as NaF, $MgF_2$ etc., of low refractive indexes, in a polymer resin, it is not proper since such a resin becomes to be cloudy and a molding capability thereof is spoiled.

At present, for the polymer substances of low refractive indexes (less than 1.4), fluoridized resins such as 4-fluoridized ethylene (PTFE), 4-fluoridized ethylene/6-fluoridized propylene (FEP) etc. are applicable. For the polymer substances of high refractive indexes (more than 1.65), polyvinylidene chloride (PVDC), polyvinylidene fluoride (PVDF), polyester group, polyphenylene sulfid (PPS) are appropriate.

Next, regarding the restriction of refractive index ratio in accordance with the expression of "$1.1 \leq n_b/n_a \leq 1.4$", we now describe the importance thereof. FIGS. 3A to 3D, 4A to 4D and 5A to 5D show diagrams of reflecting spectrum in the above-mentioned structures. These figures show a variety of relationships between a wave length λ and a reflectance, on condition that the wave length λ is 0.53 μm and the refractive index ratio $n_b/n_a$ is employed as a parameter.

FIGS. 3A to 3D represent cases where numbers N of the first and second substance layers 1 and 2 are five, respectively. Similarly, the respective numbers N in FIGS. 4A to 4D are seven and the respective numbers N in FIGS. 5A to 5D are ten. Note, in the specification, the number N corresponds to number of a pair consisting of one first substance layer 1 and one second substance layer 2. Accordingly, FIGS. 5A to 5D correspond to the embodiment of FIGS. 1A to 1C.

Figure 3A:
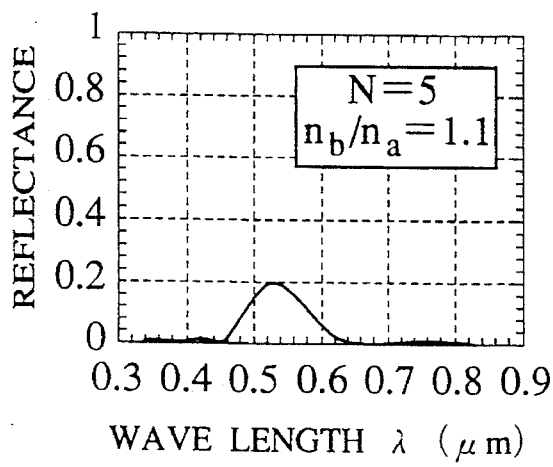
FIGS. 3A to 3D are diagrams showing relationships between the wave length and the reflectance of the structure having 5 layers for each substance layer.
Figure 3B:
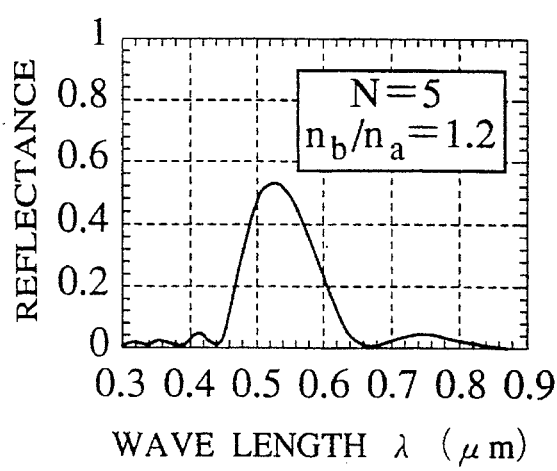
Figure 3C:
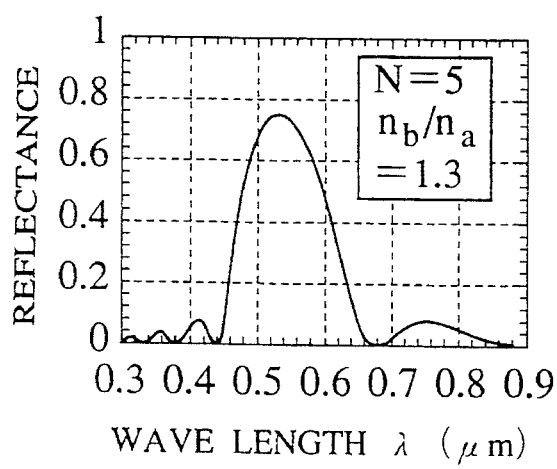
Figure 3D:
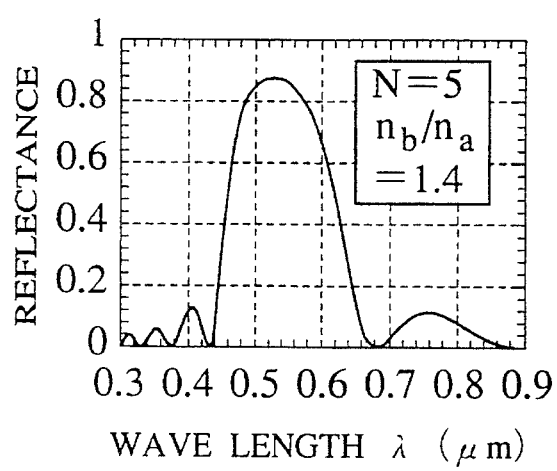
Figure 5A:
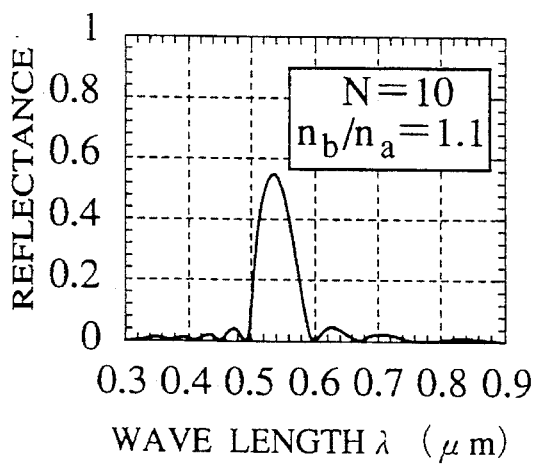
FIGS. 5A to 5D are diagrams showing relationships between the wave length and the reflectance of the structure having 10 layers for each substance layer.
Figure 5B:
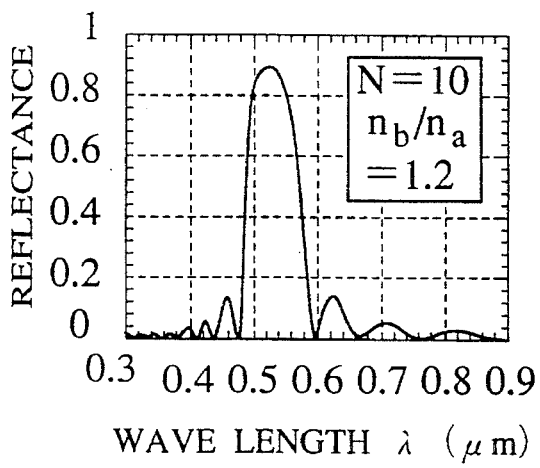
Figure 5C:
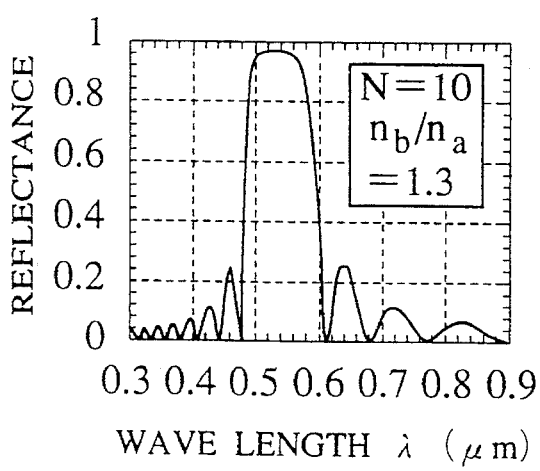
Figure 5D:
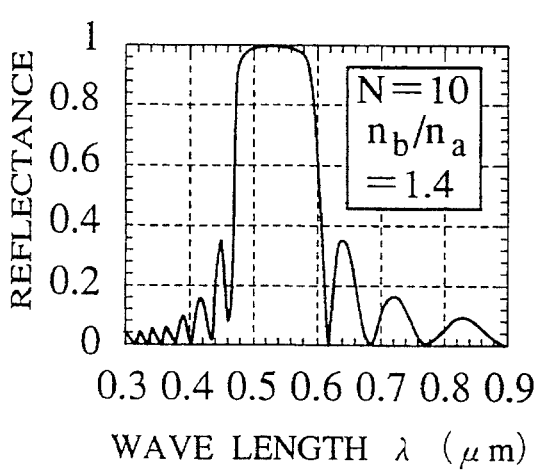

Although it is difficult to define how much the reflectance is needed to provide a beautiful color, clearly, the reflectance less than 50 percent is generally regarded as insufficient. In FIGS. 3A to 3D (N=5), when the refractive index ratio of $n_b/n_a$ is 1.1 (FIG. 3A), the reflecting ratio becomes to be extremely small (20%). When the ratio of $n_b/n_a$ is 1.2 as shown in FIG. 3B, the reflection ratio is excess of 50% to be bright. Further, in case of the number N of 10 as shown in FIGS. 5A to 5D, the reflectance ratio becomes to be excess of 50%, even if the ratio of $n_b/n_a$ is 1.1 (FIG. 5A). Accordingly, it will be understood that it is possible to increase the reflectance by increasing either the ratio of refractive index $n_b/n_a$ or the number of N.

Figure 6A:
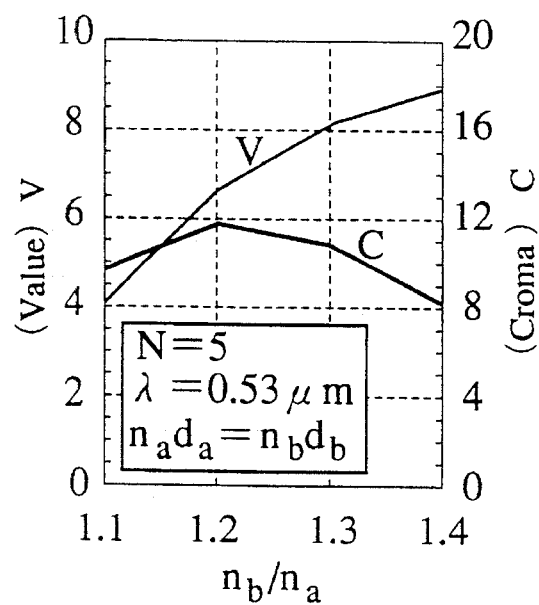
FIGS. 6A, 6B and 6C are diagrams showing relationships between the refractive index ratio $n_b/n_a$, the value and chroma in case of 0.53 μm in a peak of reflection wave length.
Figure 6B:
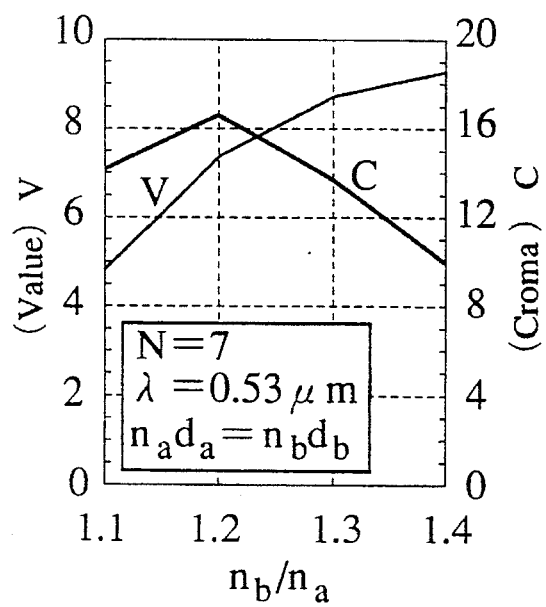
Figure 6C:
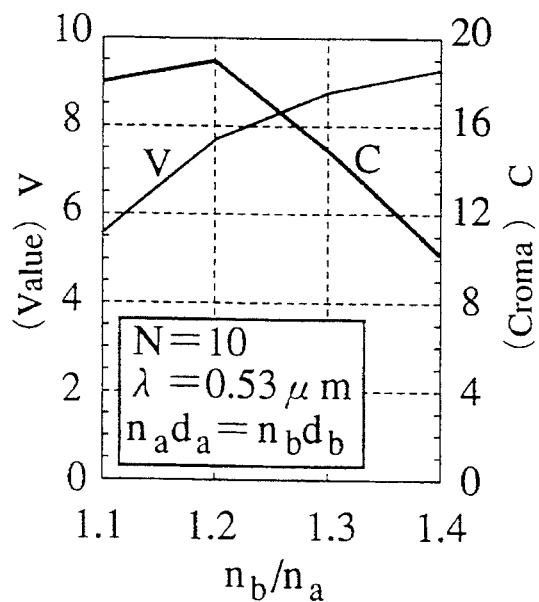

FIGS. 6A to 6C show the relationships between the refractive index ratio $n_b/n_a$, Chroma C and Value (a parameter of brightness) V, both of which are parameters closer to human's eyes rather than the reflectance, under 0.53 in the reflective peak wave length λ. In these figures, FIG. 6A shows a case of five in the number N. Similarly, FIG. 6B shows a case of seven in the number N and FIG. 6C shows a case of ten in the number N.

As will be apparent from the Munsell scale of colors, it has been found that colors more than 5 in the Chroma C and more than 4 in the Value V represents a relatively brilliant and bright color although there are more or less differences depending on the hue. Therefore, according to the Munsell scale, it is possible to obtain a sufficiently brilliant and bright color by an establishment of 1.1 to 1.4 in the refractive ratio $n_b/n_a$ and increasing the number N of layers to be laminated.

In case that the refractive index ratio $n_b/n_a$ is less than 1.1, the following problems are raised.

First, in order to attain the high reflectance in spite that the ratio of the refractive index is small, it is necessary to increase the number N. However, for example, in manufacturing a known multilayered composite yarns, there are needed complex tools, such as a special metallic cap, in order to increase the number of layers, whereby it is difficult to form more than ten layers in the structure, practically. Therefore, in order to ensure the reflectance (ex. 50%) to be needed in the practical use, it is impossible to decrease the optical refractive index ratio to a great extent.

Second, if the optical refractive index of the first layer approximates to that of the second layer, the distribution of the refractive index would be vague on the border of layers glued to each other. For this reason, preferably, the refractive index ratio $n_b/n_a$ between the layers is more than 1.1 and more preferably, more than 1.2.

On the contrary, although the polymer resin can have a high refractive index more than 1.80 by containing inorganic fillers and pigments [ex. oxides such as titan oxides (n=2.8), chrome oxides (n=2.5); sulfur oxides such as cadmium sulfid (n=2.4)], there would be raised problems that the transparency is influenced and the contents are absorbed therein.

Furthermore, since the molding capability (formability) might be damaged in the manufacturing precess, the above countermeasure is deemed to be inappropriate. Therefore, since the upper limit of the refractive index of the polymer resin is approximately 1.82, the refractive index ratio $n_b/n_a$ have 1.4 at maximum, assuming that the above-mentioned condition of "$1.3 \leq n_a$" is established.

Figure 7:
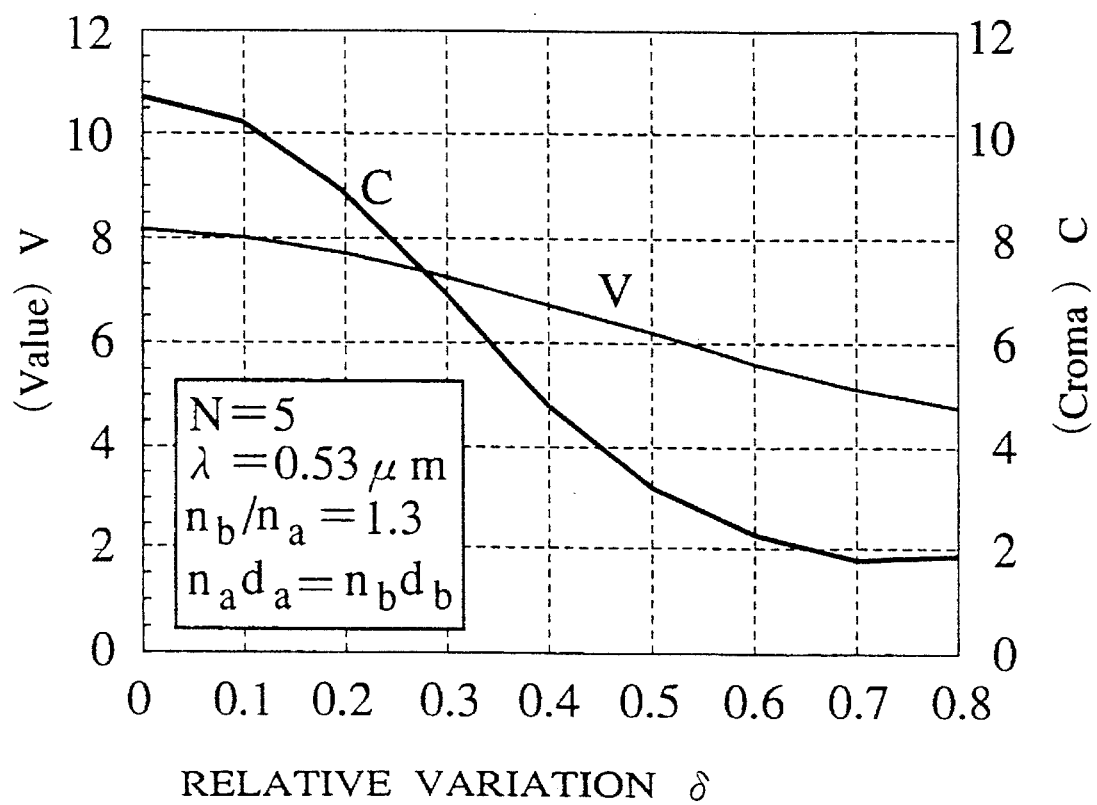
FIG. 7 is a diagram showing relationships between a relative variation δ of the thicknesses $d_a$, $d_b$ of the first and second substance layers, the value and chroma.

As a matter of course, the relative variation in the thicknesses of the first and second substance layers 1 and 2 have much influence on the hue. FIG. 7 shows a relationship between a relative variation δ of the thicknesses $d_a$, $d_b$ of the layers (differences from predetermined standards in thickness), Chroma C and Value V. The relationship shown in FIG. 7 is obtained under conditions of 0.53 nm in the reflective peak wave length, 1.3 in the refractive index ratio $n_b/n_a$, 5 in the number of layers and a further condition that an optical thickness ($n_a \times d_a$) of the first substance layer is equal to that of the second substance layer ($n_b \times d_b$).

As can be seen from FIG. 7, the Chroma C is more than 5 and the Value V is more than 4, till 40% in the thickness variation δ. In the range where the thickness variation δ is excess of 40%, the Chroma C is gradually decreased, so that the structure is not proper for practical use.

Next, we describe an adoptable range of thickness of each of the layers 1 and 2.

According to the invention, optional values for the thicknesses $d_a$, $d_b$, can be established in the range where each of the value satisfies the expression of "$\lambda = 2(n_a \cdot d_a + n_b \cdot d_b)$".

Now, the above expression can be changed as follows:

$$\lambda = 2(n_a \cdot d_a + n_b \cdot d_b) = 2 n_a [d_a + d_b(n_b/n_a)]$$

Therefore, if the desired values for the wave length λ, the refractive index $n_a$, the ratio $n_b/n_a$ are respectively given, the thicknesses $d_a$, $d_b$ can be optionally determined on condition that the above expression is satisfied thereby. For Instance, if there are selected the wave length of 0.53 μm for the desired wave length λ, 1.3 for the refractive index $n_a$, 1.3 for the ratio $n_b/n_a$ and 0.02 μm for the thickness $d_b$ of the layer 2, the other thickness $d_a$ of the layer 1 is calculated as follows:

$$\begin{aligned} d_a &= (\lambda/2n_a) - d_b(n_b/n_a) \\ &= 0.53/(2 \times 1.3) - 0.02 \times 1.3 \\ &= 0.178 \, \mu m \end{aligned}$$

Conversely, if the thickness $d_a$ is predetermined, the other thickness $d_b$ can be obtained accordingly.

Figure 8:
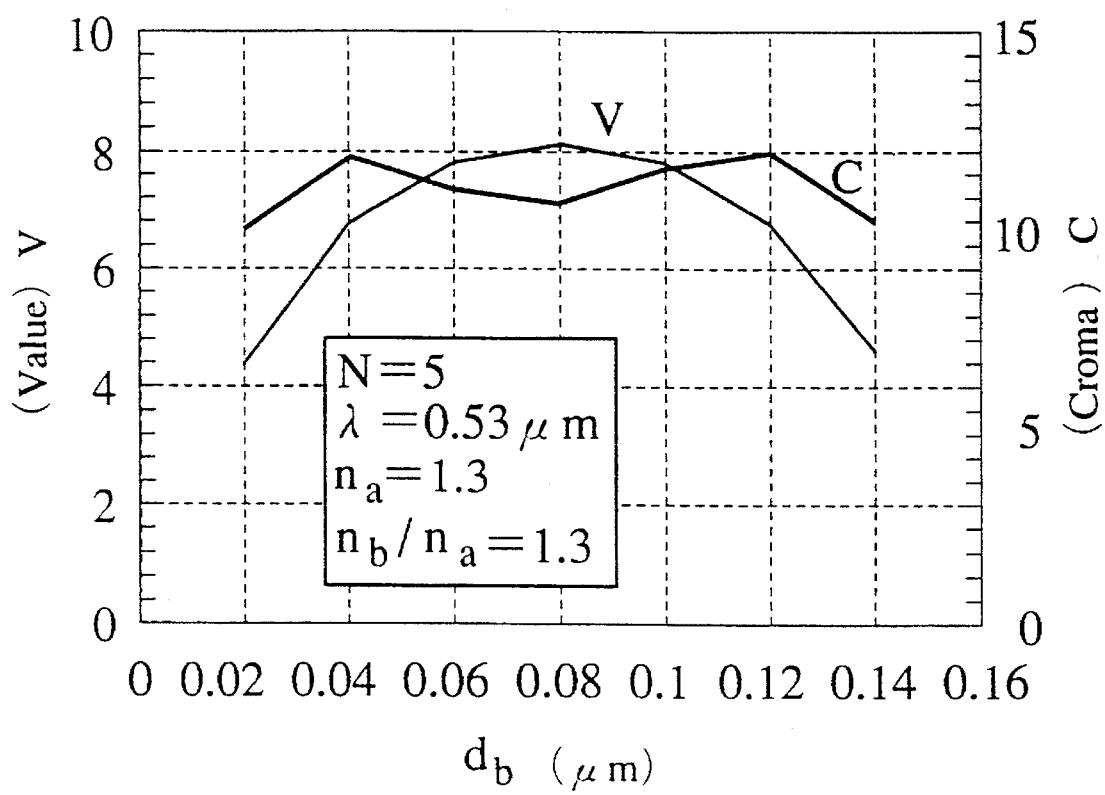
FIG. 8 is a diagram showing relationships between the thickness $d_b$ of the second substance layer, the value and chroma.

FIG. 8 shows an example of the relationship between the thickness $d_b$, Chroma C and Value V. Note, a curve shown in the figure expresses the relationship between the thickness $d_b$, Chroma C and Value V on conditions of 0.53 μm for the desired wave length λ, 1.3 for the refractive index $n_a$, 1.3 for the ratio $n_b/n_a$ and 5 for the number N of layers. It will be understood from the curve of FIG. 8 that both Chroma C and Value V represent satisfactory values whichever value from 0.02 μm through 0.14 μm the thickness $d_b$ is selected. As mentioned above, although the thicknesses of $d_a$ and $d_b$ can be optionally selected in the range where the above expression is satisfied, it is preferable that the established thickness can satisfy further expressions as follows:

$$0.016 \, \mu m \leq d_a \leq 0.44 \, \mu m$$

$$0.016 \, \mu m \leq d_b$$

Note that, as a matter of course, a best mode of the embodiment can be attained when both of the optical thickness are equal to each other (i.e., $\lambda/4 = n_a \cdot d_a = n_b \cdot d_b$).

We now describe the detailed manufacturing processes of the coloring structure with reference to experiments as follows:

Experiment 1

In order to produce the brilliant coloring structure which reflects and interferes against the light having a wave length λ of 0.53 μm, there was selected the polymer resin for attaining the ratio $n_b/n_a$ of approx. 1.3 in such a manner as follows.

First, polyvinylidene fluoride (PVDF) of low refractive index ($n_a$=1.41) was used for the first substance layer 1 and similarly, polyphenylene sulfide (PPS) of high refractive index ($n_b$=1.82) was used for the second substance layer 2. Thus, the calculated optical refractive index ratio $n_b/n_a$ in this experiment was about 1.29.

Then, after preparing tips made of both of the above resin materials, a flat fiber of mutually laminated construction was produced by a known "multilayered arrangement weaving method". The fiber was constructed so as to have seven laminated layers (N=7) and flat index of 3.5. Note, the respective substance layers 1 and 2 had 0.1 μm and 0.08 μm in thickness, which corresponds to a length of λ/4. The weaving conditions were as follows.

temperature of nozzle part: 330° C.

number of filament: 1 winding speed: 250 m/min.

cooling after weaving: air cooling

Figure 4A:
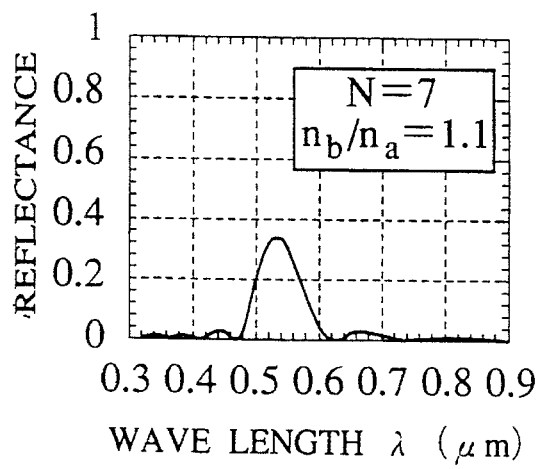
FIGS. 4A to 4D are diagrams showing relationships between the wave length and the reflectance of the structure having 7 layers for each substance layer.
Figure 4B:
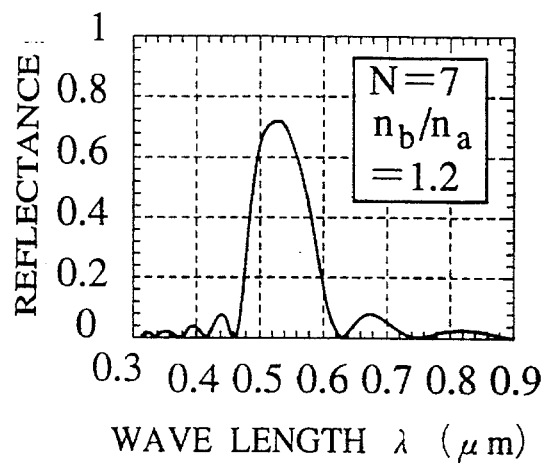
Figure 4C:
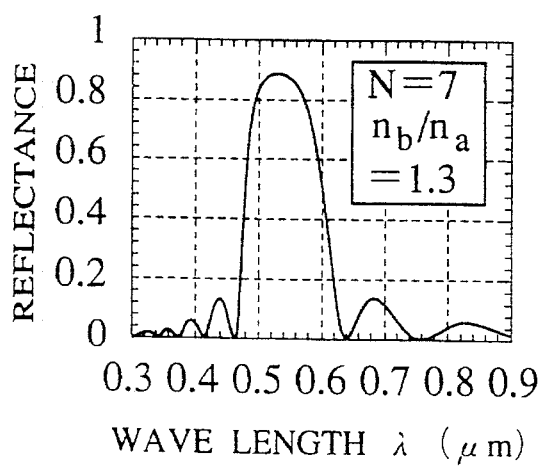
Figure 4D:
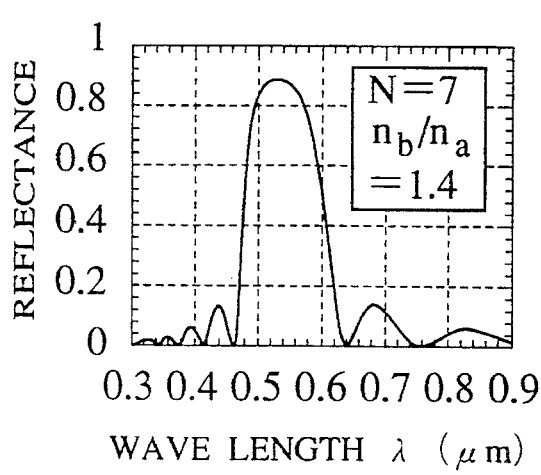

Then, the reflection spectrum of fiber obtained in this way was estimated at the angle of incidence of 0° and at the angle of receiving light of 0° by using a micro-spectrometer (Model U-6000: manu. by Hitachi Co., Ltd). Note, in this estimation, the standard white board was used to obtain the reflectance. Consequently, as shown in FIG. 4C, there was obtained a spectrum of high reflectance which came up to about 90% at 0.53 μm of the wave length λ.

In addition, as shown in FIG. 6C, the values of Chroma C and Value V were about "14" and "9", respectively, both of which exceeded a target value in hue. Furthermore, the structure had a feature that the hue can be changed in response to observing directions.

According to the above experiment, there can be obtained a yarn of about 10 μm in diameter. In application, after throwing some of yarn to a fiber, it can be woven into a finished fabric finally. In addition, by freezing the yarn obtained in the above precesses and then grinding of tips of specific volume, such as 10 μm cube, can be obtained. Then, by using the tips as coloring radiant materials for the painting of automobile and further coating transparent paints for clear layers on the coloring radiant materials, a beautiful coloring for the automobile can obtained.

Experiment 2

In order to produce the brilliant coloring structure which reflects and interferes against the light having a wave length λ of 0.64 μm, the following polymer resin materials were selected to attain the ratio $n_b/n_a$ of approx. 1.1.

First, polypropylene (PP) of low refractive index ($n_a$=1.48) was used for the first substance layers 1 and similarly, polyethylene terephthalate (PET) of high refractive index ($n_b$=1.68) was used for the second substance layers 2. Therefore, in this experiment, the calculated optical refractive index ratio $n_b/n_a$ was about 1.13.

After preparing tips made of the above resin materials in this way, a composite flat fiber which includes the irregular cross-sectional structure shown in FIG. 2B was produced by a known combined weaving method. The method comprises a process to inject the different polymer materials into both central parts and sheath parts of the structure and a process to cool and extend them thinly to a desired volume. The weaving conditions were as follows.

temperature of nozzle part: 290 ° C.

number of filament: 1 winding speed (including extending process): 4000 m/min.

cooling after weaving: air cooling

Regarding specifications of the composite flat fiber produced in this way, each of the sheath part, which corresponds to the first substance layer 1 of FIG. 2B, had 0.11 μm in thickness and each of the central parts, which corresponds to the second substance layer 2, had 0.09 μm in the thickness. The fiber comprises ten laminated layers in each of the first and second layers (N=10).

Figure 9:
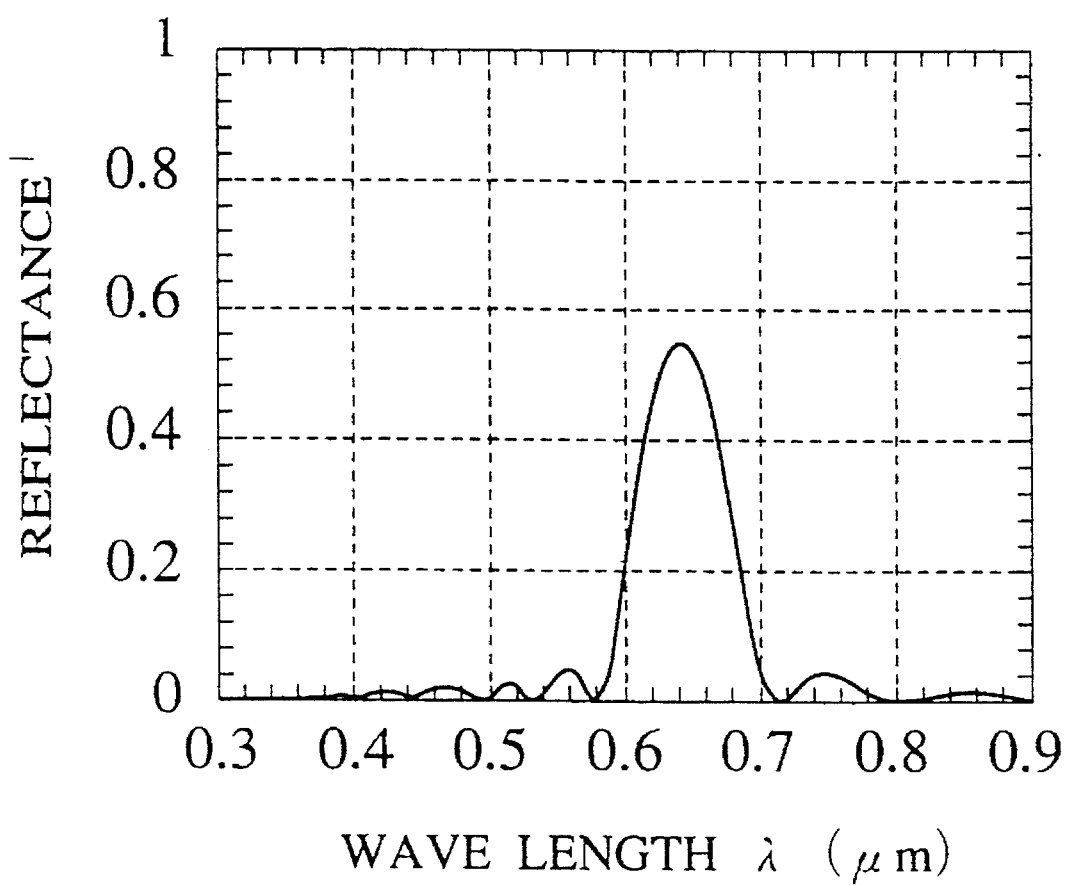
FIG. 9 is a diagram showing relationships between the wave length and the reflectance of the structure according to the second embiodiment shown in FIGS. 2A to 2D.

Then, the reflection spectrum of fiber obtained in this way was estimated at the angle of incidence of 0° and at the angle of receiving light of 0° by using a microspectrometer (Model U-6000: manu. by Hitachi Co., Ltd). Consequently, as shown in FIG. 9, there was obtained a spectrum reflectance ratio of which was about 50% at approx. 0.64 μm in the wave length $\lambda$.

In addition, the flat fiber was characteristic of "15" in the Chroma C and "5" in the Value V, both of which exceeded the target value of hue. Note that, also in this experiment, the so produced fiber can be processed into a fabric and tips.

By the way, the above mentioned reflecting spectrum in the coloring structure is influenced by not only the reflecting and interfering actions of natural light but also fluorescent elements containing fluorescent pigments. From this point of view, we describe the fluorescent pigments to be contained in the coloring structure of the invention.

In the present invention, the fluorescent pigments have to be excellent in terms of stability in characteristic, such as deterioration of color, blooming etc. Further, the pigments to be contained have to fluoresce in an area of visible lights wave lengths of which are in the range of 380 to 780 nm. Of course, it goes without saying that the pigments have to be excellent in solubility and mixing capacity with a variety of polymer resin materials and liquid crystal polymer resin materials. From the point of view, organic fluorescent pigments are relatively appropriate for the pigments of the structure although inorganic fluorescent pigments can be also used therefor.

For example, the usable fluorescent pigments in every wave lengths with which the pigments can make the most fluorescence, are as follows:

Wave lengths: organic fluorescent pigments

380–400 nm: Pyrene, Carbostrill No. 124

400–500 nm: Coumarin No. 1, 151, 152, 339 Pterin, Biopterin Noepterin, Isoxanthopterin 500–600 nm: Rhodamine 6G, Sulferhodamine B, Rhodamine B 700– nm: Styryl 17, DOTC Iodite etc.

Inorganic fluorescent

ZnS+Cu (green fluorescence),

CaS+Bi (purple/blue fluorescence) etc.

Figure 10:
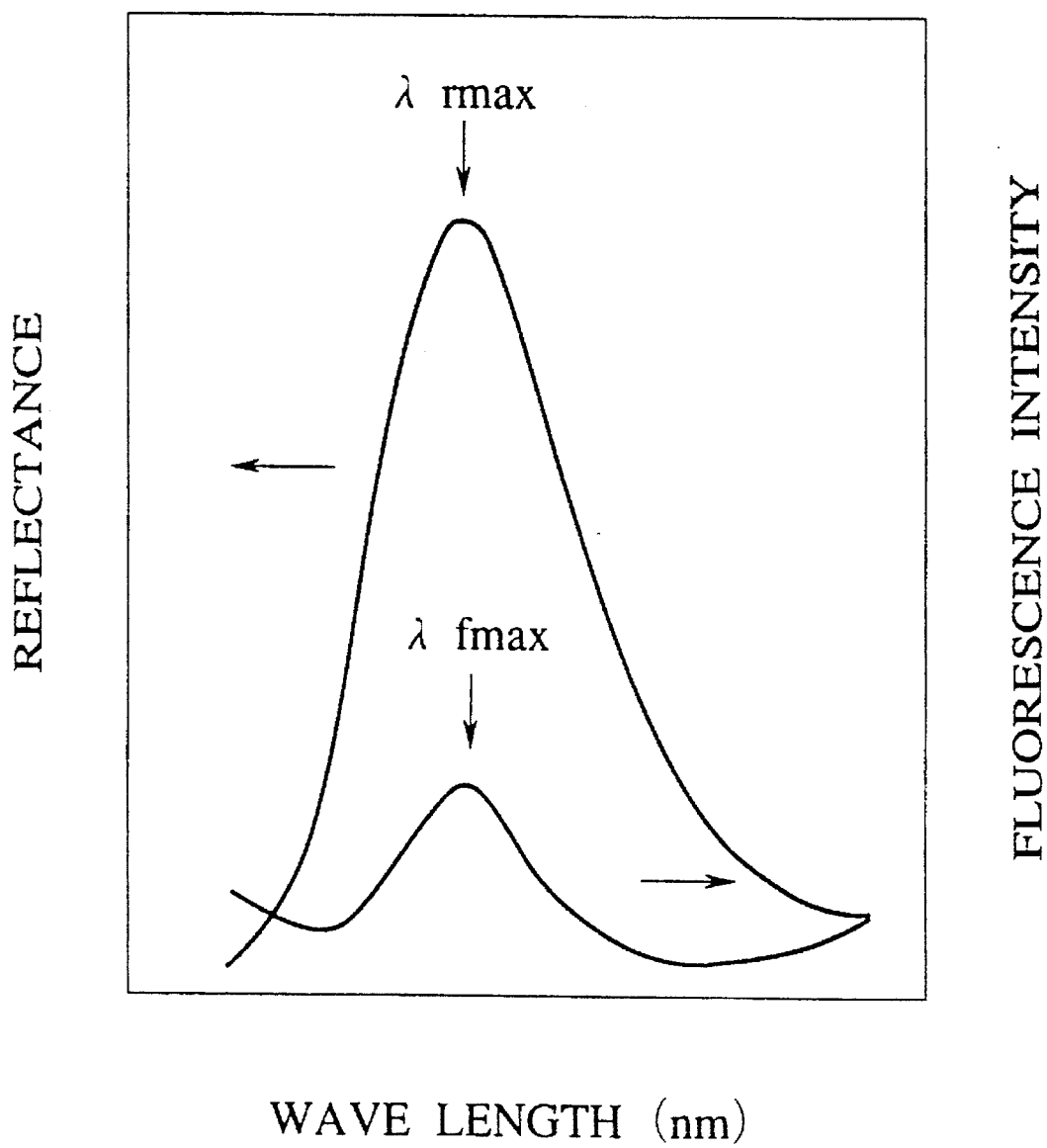
FIG. 10 is a diagram showing relationships between the reflectance, the fluorescence intensity and the wave length according to the invention.

Since an object of the invention is to improve the coloring derived from the reflecting and interfering actions in the visible light range, in other words, to increase the reflection spectrum in this wave length range, the pigments to be employed must be ones which can fluoresce in the same range of wave length. Accordingly, in the present invention, the contained fluorescent pigments can fluoresce in the visible light range of 380 to 780 nm in the wave length. Regarding selection of the pigments, it is preferable to select the pigment having a wave length $\lambda$ rmax to offer the maximum reflectance, close to a wave length $\lambda$ fmax to offer the maximum fluorescence intensity of the fluorescent pigment, as shown in FIG. 10. Then, due to an interacting ellect of both wave lengths, a peak of the reflecting spectrum is increased to be more than 100%.

In case of a large difference (>40 nm) between the wave lengths $\lambda$ rmax and $\lambda$ fmax, a peak of the reflecting spectrum is shifted to either a short wave length side or a long wave length side, or a shoulder part appears in the reflecting spectrum. Consequently, the spectrum becomes to be broader and the peak does not increase so much, whereby it does not provide a brilliant color at all. Note that, the above sifting of the peak of the reflection spectrum due to the difference between $\lambda$ rmax and $\lambda$ fmax means a possibility of controlling the peak of reflection spectrum, corresponding to the kind of fluorescent pigment to be selected. Further, in the specification, the above term of "a brilliant color" means a color which is of the Value V more than 15% in accordance with the scale difined by CIE (Commission International de l'Eclairage) in France.

In case of manufacturing the coloring structure having a peak of reflection spectrum in the vicinity of 560 nm in the wave length, it may be used a fluorescent pigment which provides a maximum fluorescence intensity in the vicinity of 560 nm in the wave length for the coloring structure having a designed coloring of 560 nm in the wave length by the reflecting and interfering actions. In this case, the organic fluorescent pigments such as Rhodamine 6G ($\lambda$ fmax=555 nm) and Rhodamine B ($\lambda$ fmax=565 nm) etc. can be selected.

Figure 11:
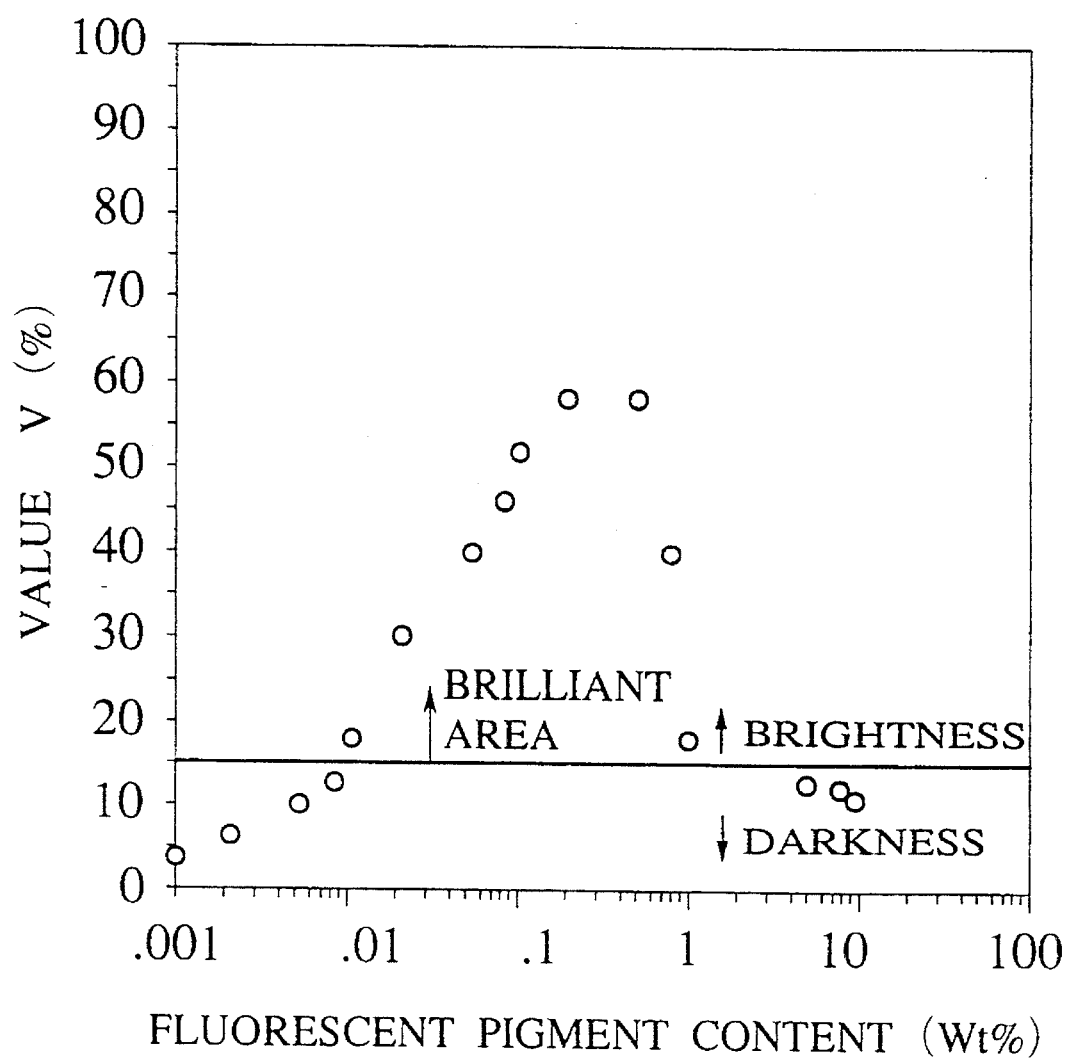
FIG. 11 is a diagram showing a relationship between the content of fluorescent pigment and the value according to the present invention.

FIG. 11 shows a relationship between the value V as a parameter of brilliance and the content W of fluorescent pigment. As shown in the figure, in a range where the content of fluorescent pigment contained in the constituents is less than 0.01 wt %, it is impossible to obtain the objective brilliant Value and hue since the fluorescence intensity in the range is weakened. On the other hand, in a range where the content of pigment is more than 1.0 wt %, it is difficult to realize a primary coloring derived from the reflecting and interfering action since the transparency of constituents is influenced. Further, the Value is lowered since the increased contents of pigment act to extinguish the light. Again, in this case, the optical refractive index varies on a large scale and colors generated from the fluorescent pigments contained in the constituents make refraction and disperse, whereby it is impossible to control the desired reflection spectrum finely and it becomes to be broad. Accordingly, the content of pigments in a range of 0.01 to 1.0 wt % is deemed to be particularly appropriate. Note, also in a range of 1 to 3 wt %, some extent of effects would be expected although the peak of reflection spectrum is decreased a little.

Although it is possible to increase the whole reflection spectrum by containing several kinds of organic fluorescent pigments of different wave lengths of fluorescence, then the reflection spectrum becomes to be broader.

Figure 12A:
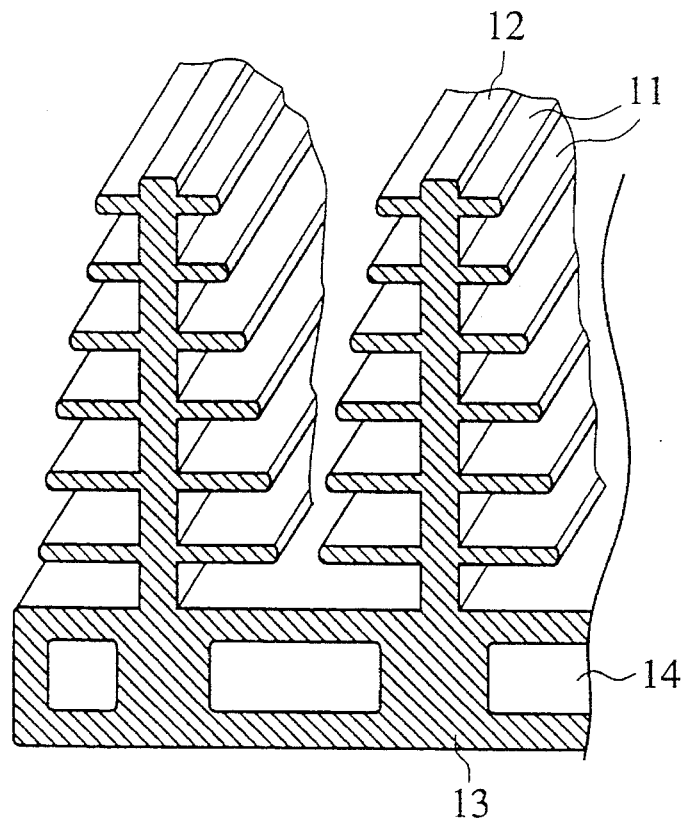
Figure 12B:
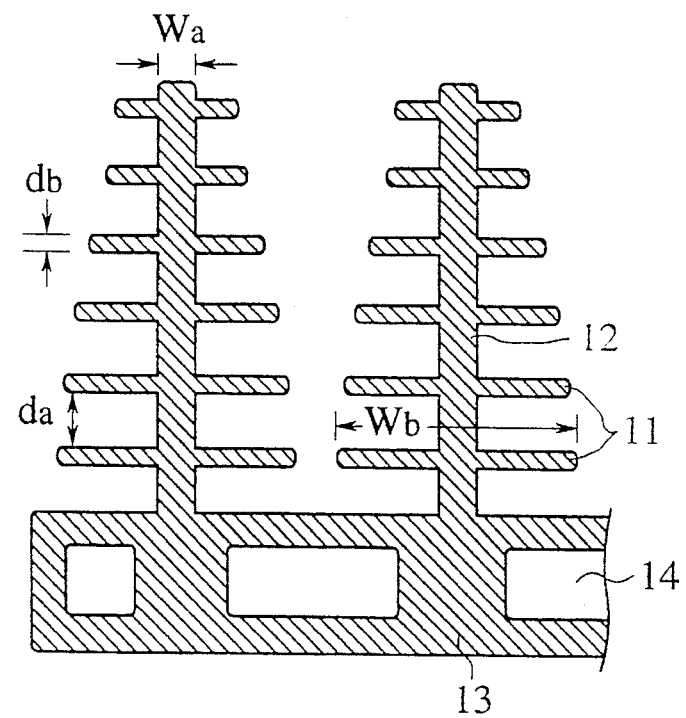

FIG. 12A is a perspective view of a coloring structure in accordance with a third embodiment and FIG. 12B is a cross sectional view thereof. The shown structure is a laminated construction consisting of projecting wing parts and aerial layers.

Through the figures, reference numeral 11 denotes the projecting wing parts, 12 central parts, 13 a mounting part (base part) and 14 void spaces. The mounting part (base part) 13 has a plurality of constituents arranged thereon, each of which is consisting of a plurality of wing parts 11 and the central part 12. The wing parts 11 are respectively formed in such a manner that the width thereof in the horizontal direction is gradually increased as the part 11 approaches the mounting part (base part) 13 That is, the width of wing part 11 has a minimum in the vicinity of an end of the central part 12 far from the mounting part 13. Due to a tapered configuration of the wing parts 11, it is possible for the light to reach into the bottom parts of the constituents. In the modification, constituents having the wing parts of same widths $W_b$ may be used for the structure.

In general, when molding such a complexly shaped structure as the above structure by an injection or squeezing molding, there is caused a problem of difficulty to maintain the shape of structure precisely by a deviation of flow rate of soluble material used in the molding. From this point of view, it is preferable that a cross sectional area of the mounting part 13 approximates to a cross sectional area of the constituents mounted thereon. This is the reason why the void spaces parts 14 are provided in the mounting part 13.

In the coloring structure of FIGS. 12A and 12B, both a width $W_a$ of the respective central parts 12 and a width $W_b$ of the respective wing part 11 are established so as to satisfy a relationship of $W_b \geq 3 \cdot W_a$. Further, the relationship between the thickness $d_a$ of respective aerial layers and the thickness $d_b$ of each wing part 11 is established to satisfy the following expressions.

$$0.02 \text{ μm} \leq d_a \leq 0.4 \text{ μm}$$

$$0.02 \text{ μm} \leq d_b$$

$$1.2 \leq n_b \leq 1.8$$

In addition, the thickness $d_b$ is established in such a manner that a relative variation thereof, that is, maximum of manufacturing differences from a standard of $d_b$ is less than 40 percent of thereof.

With the above mentioned arrangement, it is possible to produce a coloring function derived from the reflecting and interfering actions in the visible light area, thereby generating hues of purple through peacock blue, which look a different color corresponding to a observing direction.

For fluorescent pigments contained in the above coloring structure, Biopterin, which is an organic fluorescent pigment manufactured by Dr. Shricks Lab. to generate blue fluorescence, was prepared. Then it was mixed with PET (polyethylene terephthalate) made by Teijin Co., Ltd. and then the mixture was kneaded by squeezing machine (25 mmϕ), thereby preparing a master tip containing the fluorescent pigment of 5 wt %.

Figure 13A:
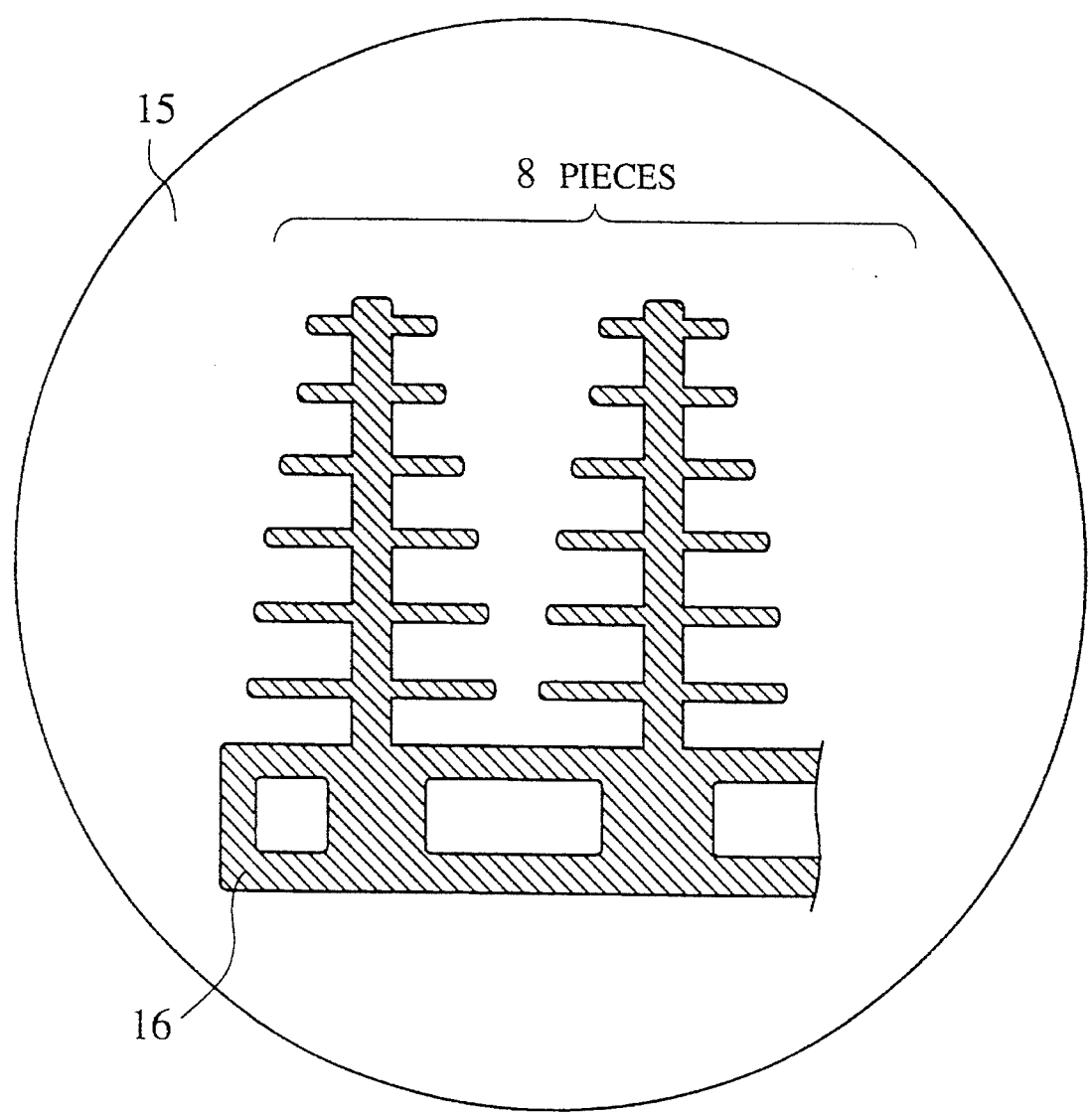

The so obtained master tips (refractive index; n=1.6) were selected for materials of a "island" part 16 (see. FIG. 13A) and polystyrene (PS) tips (Asahikasei Co., Ltd) were selected for materials of a "sea" part 15. Consequently, a "island" shaped composite fiber as shown in FIG. 13A was obtained by a melting weaving method. The fiber comprises the island part 16 consisting of the wing parts 11, the central parts 12, the mounting part 13 and the void spaces 14, and the sea part 15 for retaining the part 16. Note, the number of the central parts 12 was eight. The weaving conditions were as follows;

Temp. of screw part: 280° C. (PET tip) 270° C. (PS tip)

Temp. of nozzle part: 290° C.

Number of filament : 1

Cooring after weaving: air cooling

Weaving speed : 4000 m/min.

Figure 13B:
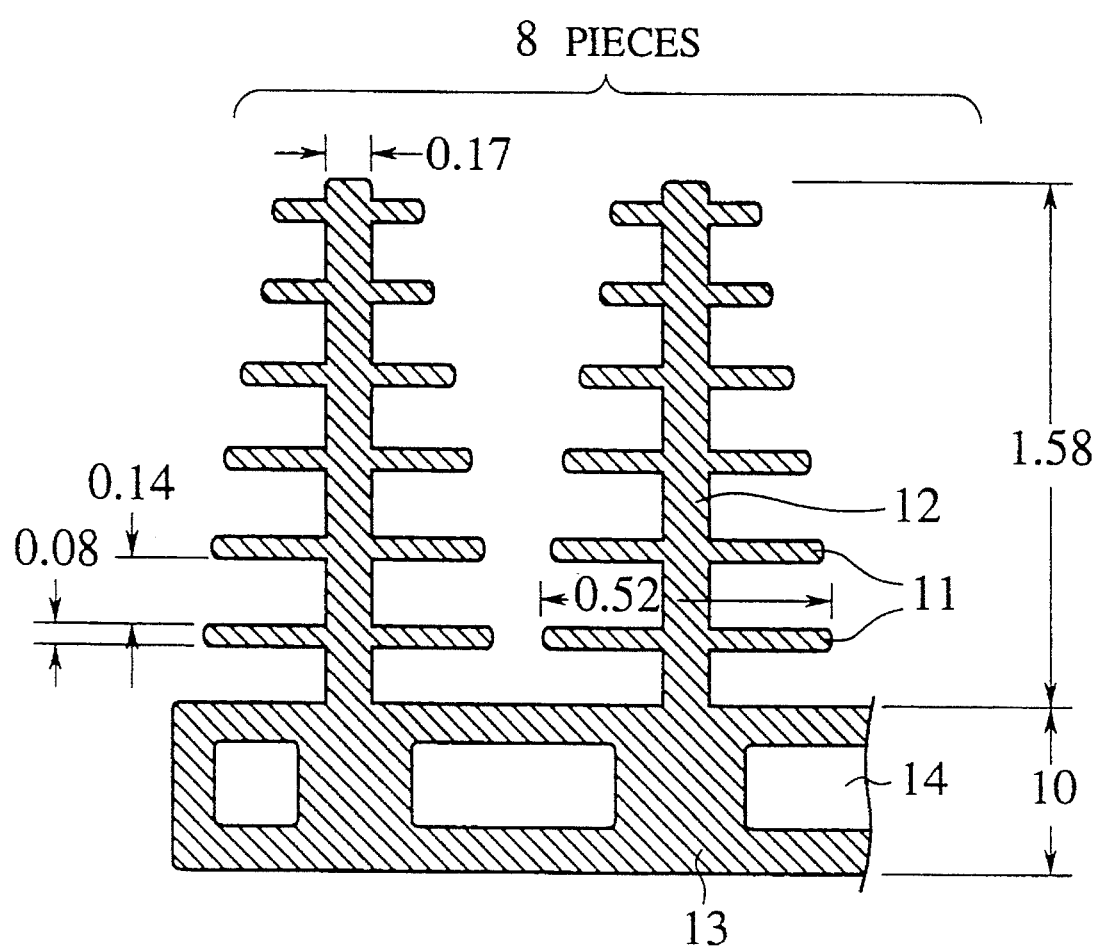

Then, the sea part (PS) 15 was eliminated by a solution of methyl-ethyl ketone (MEK), whereby there was finally obtained the structure consisting of the layers of polyethylene terephthalate (n=1.6) containing the fluorescent pigment and the aerial layers (n=1.0), as shown in FIG. 13B. Regarding dimensions of each parts of the structure, there are shown in the figure. Note that, the mounting part 13 was formed to have a configuration enough to support the central parts 12.

Figure 14:
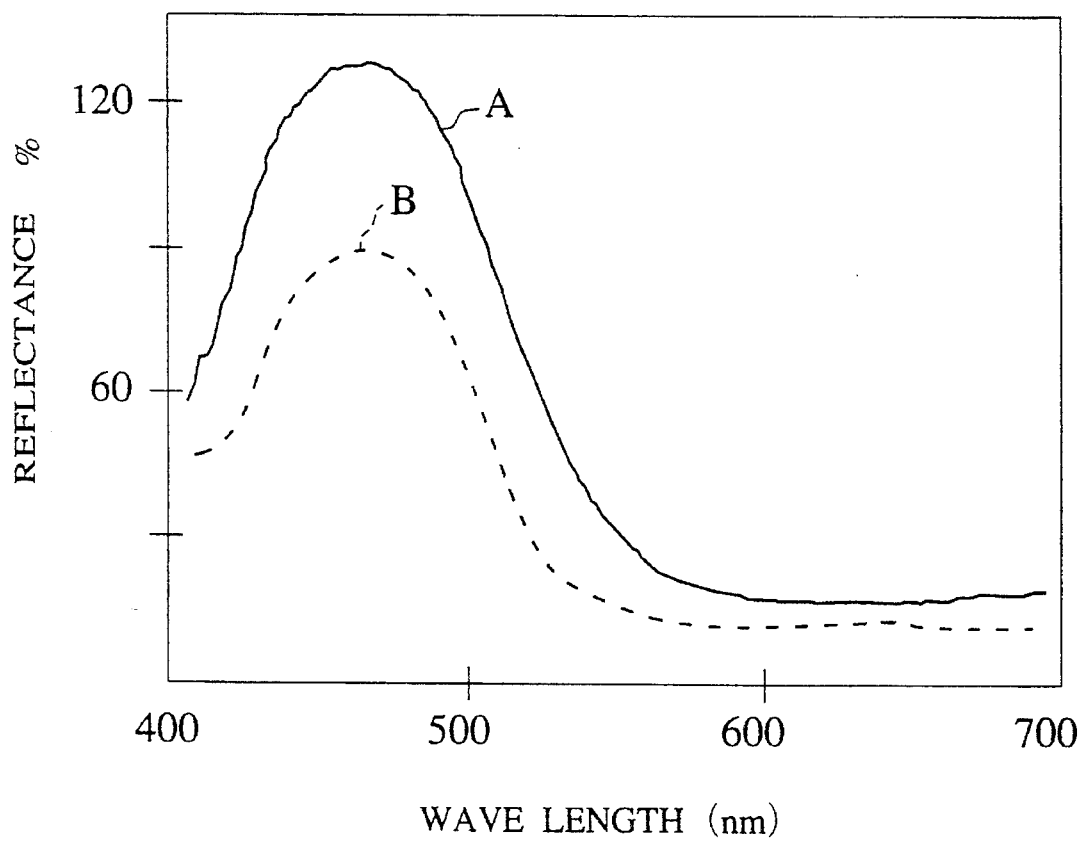
FIG. 14 is a diagram showing relationships between the reflectance and the wave length of the structure of FIGS. 12A to 13B.

Then, the reflection spectrum of coloring structure obtained in this way was estimated at the angle of incidence of 0° and at the angle of receiving light of 0° by using a micro-spectrometer (Model U-6000: manu. by Hitachi Co., Ltd). Note, in this estimation, the standard white board was used to obtain the reflectance. FIG. 14 shows a result of the above measurement. In FIG. 14, a curve A designates a spectrum of the above structure to generate a brilliant blue color. Note, the reflecting ratio comes up to about 130% of maximum at 470 nm in the wave length.

On the other hand, the remaining curve B denotes a spectrum in case that the other structure does not contain any of fluorescent pigments. This structure, employing PET (n=1.6; manu. by Teijin ) as material for the island parts and PS (manu. by Asahikasei) as material for the sea part, was obtained in the same manner as mentioned above. Further, it generates a blue color. Note, the reflecting ratio comes up to about 90% of maximum at 470 nm in the wave length. Therefore, from the test results, it will be understood that, by containing the fluorescent pigments therein, an increase of about 40% can be accomplished in term of the reflectance.

Next, we describe the detailed manufacturing method of the structures of complex configuration as shown in FIGS. 12A to 13B. As methods for manufacturing such structures, there can be employed a vaporization technique a resinous forming technique and an application of weaving technique etc. Now, we describe the method using the weaving technique.

In order to obtain the above complex structure stably, the double-melting weaving method of both cores (the island parts 16) and sheath (the sea part 15) is appropriate. For example, positioning a nozzle, which has dimensions of 900 times as much as cross sectional dimensions of the desired structure, into a head part of a double weaving machine, polymer materials of different melting points are used for the cores and sheath, respectively. For example, using PET for the core material and dissolved postyrene at 230° for the sheath material, these materials are simultaneously injected through an extruder connected the head part at 290° C. in the temperature of nozzle and 600 to 850 kg/cm² in the injection pressure. Then, after passing through an air cooling section of 3 to 4 m in length, the structure is drawn at speeds of 1000 to 8000 m/min. so that the actual thickness of the wing parts and intervals therebetween etc. realize dimensions in the desired area of wave length, respectively. Next, after dissolving the sheath part with solvents such as methylethyl ketone, acetic ethyl, benzole, triole, the structure (for ex. yarn) as shown FIGS. 12A to 13B. is manufactured finally. According to the above mentioned processes, there can be obtained a yarn of about 10 μm in diameter. Some yarns can be woven into a finished fabric.

By freezing the yarn obtained in the above manner and then grinding it, a lot of tips of ex. 10×20×30 μm can be obtained. In application, when the tips are used for coloring radiant materials of paints for automobile and then a transparent paints are coated thereon as clear layers positioned on a top surface, it is possible to provide a beautiful coloring against the automobile. Note, since spaces between the respective wing parts are remarkably small in the coloring structure, paints of high stickness cannot intrude into the spaces, thereby maintaining the presence of the aerial layers.

Figure 15:
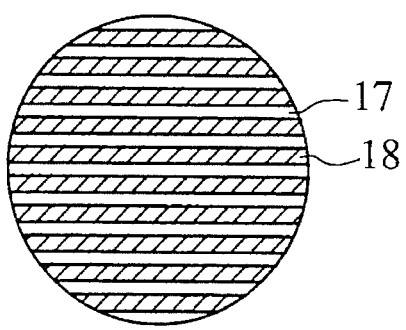
FIG. 15 is a cross sectional view of a coloring structure according to a fourth embodiment of the present invention.

We now describe a fourth embodiment, referring to FIG. 15 in which there is shown a laminated structure different from the structures shown in FIGS. 12A to 13B.

First Neopterin of 1 wt % which is an organic fluorescent pigment manufactured by Dr. Shrieks Lab. to generate blue fluorescence, was mixed with polyphenylene sulfide (PPS; n=1.82; manu. by Kureha Chemical Co., Ltd). Then, the mixture was kneaded by a squeezing machine (25 mmφ) to form a thread shaped rod. The rod was then cut to pieces, thereby preparing first master tips.

Similarly, Neopterin of 1 wt % was mixed with polyvinylidene fluoride (PVDF; n=1.41; manu. by Kureha Chemical Co., Ltd). The mixture was kneaded by the above squeezing machine (25 mmφ) to form a thread shaped rod. The rod was then cut to pieces, thereby preparing second master tips. Next, both first and second tips were charged into a combined weaving machine, whereby there can be prodeuced by the known "multilayered arrangement" weaving method, a mutually laminated type of fiber which has about 20 μm in diameter and which comprises ten PPS layers 17 and ten PVDF layers 18 laiminated thereon by turns.

The weaving conditions were as follows.

weaving temperature: 330° C.

number of filament: 1 winding speed (including drawing process): 5000 m/min.

cooling after weaving : air cooling

By the inventor's consideration, it is found that the following relationships between an optical reflective index $n_a$ of each layer 17, a thickness d, thereof, a reflective index of $n_b$ of each layer 18 and a thickness $d_b$ thereof has to be satisfied in order to generate a brilliant color.

Re. refractive index:

$1.3 \leq n_a$ $1.1 \leq n_b/n_a \leq 1.4$

Furthermore, the relationship between the peak wave length λ, the refractive indexes and thicknesses is as follows.

$$\lambda = 2(n_a \cdot d_a + n_b \cdot d_b)$$

Further, it is preferable to satisfy the following relationship therebetween.

$$d_a = \lambda/4n_a; \quad d_b = \lambda/4n_b$$

In this embodiment, one of the PPS layers 17 has 0.08 μm in thickness and one of the PVDF layers 18 has 0.14 μm in thickness. Since the refractive index ratio of polymer materials forming both of the layers is approx. 1.3 (= 1.82/1.41), the above conditions can be satisfied, thereby providing a structure coloring by the reflecting anf interfering actions of the natural light even if it does not contain the fluorescent pigments.

Figure 16:
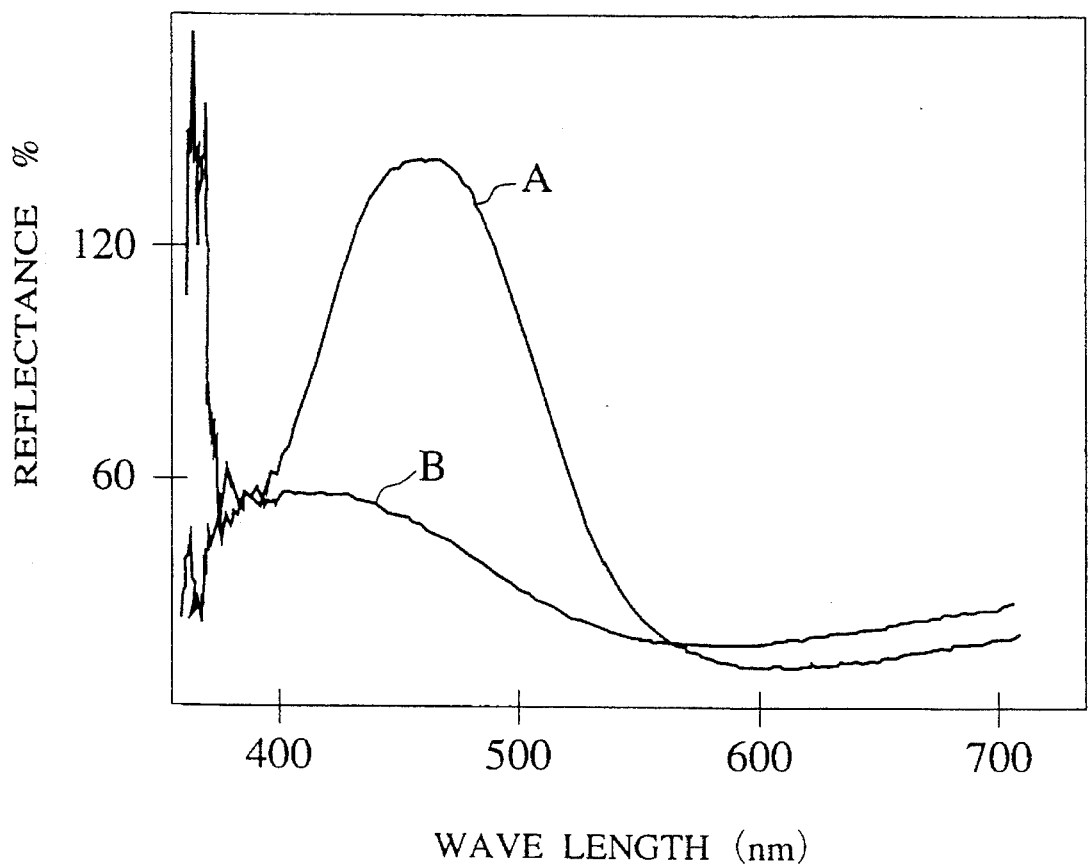
FIG. 16 is a diagram showing relationships between the reflectance and the wave length of the structure of FIG. 15.

FIG. 16 shows a reflection spectrum diagram of the fiber shown in FIG. 15. In FIG. 16, a curve of A corresponds to this embodiment and the other curve of B corresponds to a cace that no pigment is contained. As can be seen from FIG. 16, the reflectance ratio in accordance with the embodiment is remarkably high of 150% and further exhibits a sharp spectrum curve to generate a brilliant cobalt blue. In case that no pigment is contained, the reflectance ratio thereof is of about 60%. Therefore, it will be understood that the effect of using the fluorescent pigment is remarkable. Note that, in the embodiment, although the ratios of pigments contained in both of the layer 17 and 18 are respectively established to 1 wt %, the former ratio may be different from the latter ratio.

Finally, according to the present invention, it is possible to provide a coloring structure which has a brilliant hue in comparison with the conventional structure and which can change the coloring pattern corresponding to directions of vision.

Furthermore, according to the invention, since the structure can be easily processed into either thin fiber or small tips, it is convenient for practical use.

What is claimed is:

1. A coloring structure for generating a color having a wave length in an area of a visible light by reflecting and interfering actions of a natural light, comprising:

first substance layers consisting of a first material, each of said first substance layers having an optical refractive index of $n_a$; and second substance layers consisting of a second material, each of said second substance layers having an optical refractive index of $n_b$ and overlying a respective one of said first substance layers in an alternating arrangement of said first and second layers;

wherein the relationship between said optical refractive indexes $n_a$, and $n_b$ is established to satisfy the following expressions $1.3 \leq n_a$ $1.15 \leq n_b/n_a \leq 1.4$.

2. A coloring structure as claimed in claim 1, wherein said coloring structure contains a fluorescent pigment which generates fluorescence corresponding to said color.

3. A coloring structure as claimed in claim 2, wherein said fluorescent pigment is contained in said coloring structure with a range of 0.01 through 1.0 weight percentage.

4. A coloring structure as claimed in claim 1, wherein each of said first substance layers has a thickness of $d_a$ and each of said second substance layers has a thickness of $d_b$ and a reflective peak wave length is λ and wherein said values of $d_a$, $d_b$ and λ are established to satisfy an expression of $\lambda = 2(n_a \cdot d_a + n_b \cdot d_b)$ and wherein maximum values of manufacturing differences from standards in the thicknesses $d_a$ and $d_b$ of said first and second substance layers are less than 40 percent of thereof, respectively.

5. A coloring structure as claimed in claim 4, wherein said coloring structure contains a fluorescent pigment which generates fluorescence corresponding to said color.

6. A coloring structure as claimed in claim 5, wherein said fluorescent pigment is contained in said coloring structure with a range of 0.01 through 1.0 weight percentage.

7. A coloring structure as claimed in claim 1, wherein said first and second layers are made of polymer substance having no transparent impurities to increase an optical refractive index thereof 8. A coloring structure for generating a color having a wave length in a visible light spectrum by reflecting and interfering actions of a natural light, comprising:

a plurality of first substance layers comprising a first material, each of said first substance layers having an optical refractive index $n_1$ which is at least 1.3; and a plurality of second substance layers comprising a second material, each of said second substance layers having an optical refractive index $n_b$ and overlying a respective one of said first substance layers, said optical refractive index $n_b$ of said second substance layers being greater than said optical refractive index $n_a$ of said first substance layers by an amount in the range of 10% to 40%;

said first and second layers alternating with one another.

9. A coloring structure as recited in claim 8, wherein said alternating first and second layers contact each other.

10. A coloring structure for generating a color having a wave length in a visible light spectrum by reflecting and interfering actions of a natural light, comprising:

a plurality of layers of first and second materials for reflecting natural light to generate the color, wherein each of said plurality of layers of said first material has an optical refractive index $n_a$ which is at least 1–3; and each of said plurality layers of said second material has an optical refractive index $n_b$ and overlies a respective one of said layers of said first material, said optical refractive index $n_b$ of said layers of said second material being greater than said optical refractive index $n_a$ of said layers of said first material by an amount in the range of 10% to 40%;

said first and second layers alternating with one another.

* * * * *